United States Patent [19]

Hanyu et al.

[11] 4,323,022
[45] Apr. 6, 1982

[54] PATTERN SELECTING SYSTEM FOR ELECTRONIC SEWING MACHINE

[75] Inventors: Susumu Hanyu; Kenji Kato, both of Hachioji, Japan

[73] Assignee: Janome Sewing Machine Co. Ltd., Tokyo, Japan

[21] Appl. No.: 97,871

[22] Filed: Nov. 27, 1979

[30] Foreign Application Priority Data

Dec. 6, 1978 [JP] Japan .................................. 53/149998

[51] Int. Cl.$^3$ ............................................. D05B 3/02
[52] U.S. Cl. ................................................. 112/158 E
[58] Field of Search .......... 112/158 E, 121.11, 121.12, 112/158 F

[56] References Cited

U.S. PATENT DOCUMENTS

| | | | |
|---|---|---|---|
| 4,005,664 | 2/1977 | Garron | 112/158 E |
| 4,104,976 | 8/1978 | Landau, Jr. et al. | 112/121.11 |
| 4,122,786 | 10/1978 | Tanimoto et al. | 112/158 E |
| 4,177,744 | 12/1979 | Wurst et al. | 112/158 E |
| 4,275,674 | 6/1981 | Carbonato et al. | 112/158 E |

*Primary Examiner*—Peter P. Nerbun
*Attorney, Agent, or Firm*—Michael J. Striker

[57] ABSTRACT

Patterns stored in the memory of an electronic sewing machine are divided into a group of patterns which is more frequently used and a group of patterns which is less frequently used. Patterns which are more frequently used can be selected by individual pushbuttons, and corresponding panels depicting such patterns will be lit up. Patterns less frequently used are listed by either a two digit decimal number or an alphameric character, and are selected by operation of one of two additional pushbuttons, and at least one character representing the pattern selected is displayed.

6 Claims, 7 Drawing Figures

Fig_1
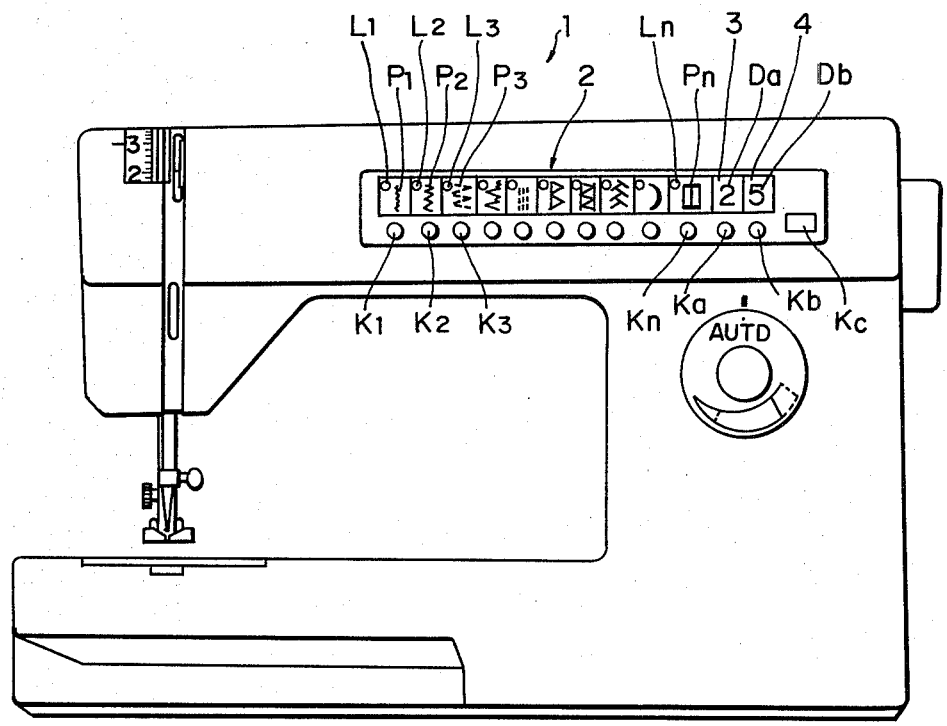
Fig_6
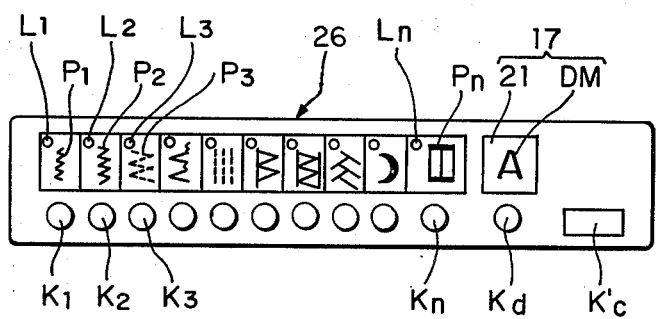

Fig_2

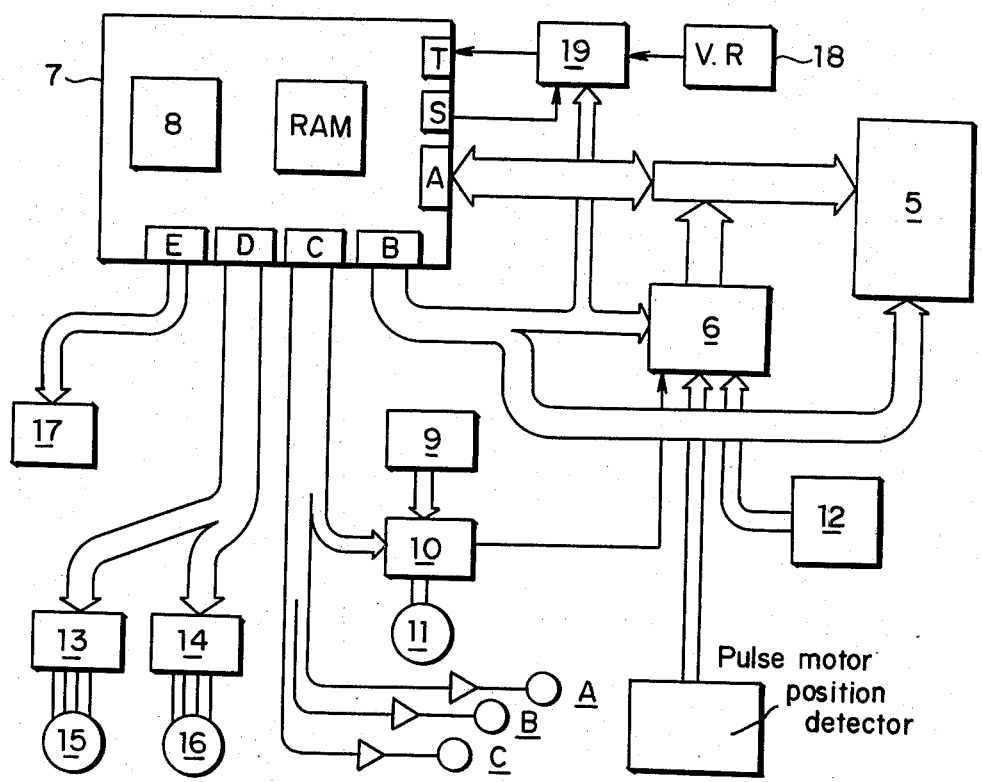

7 : Control part
8 : ROM Program & Pattern data
13 : Pulse motor driver
14 : Pulse motor driver
15 : Feed control pulse motor
17 : Indicator
19 : A/D Converter
5 : LED Matrix
6 : Key matrix
9 : Controller 16 : Needle position control pulse motor
10 : Machine motor control circuit
11 : Machine motor
12 : Needle position detector
A : Thread winding control solenoid
B : Needle drop hole switching solenoid
C : Feed dog switching solenoid

Fig_3
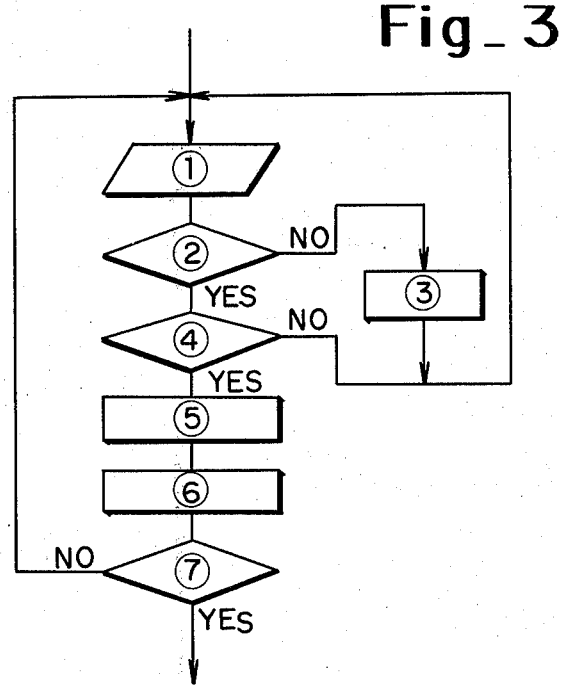
1 : Key input
2 : Key ON
3 : Key OFF flag is set
4 : Preceded key is OFF
5 : Count-Up 1
6 : Key OFF flag is cleared
7 : Controller ON
Fig_4
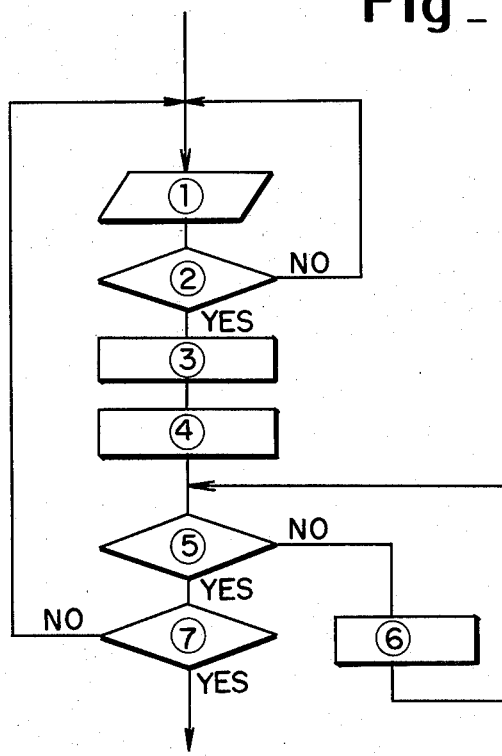
1 : Key input
2 : Key ON
3 : Count-Up
4 : ACC is set O
5 : ACC = FF
6 : ACC ← ACC + 1
7 : Controller ON

Fig_5
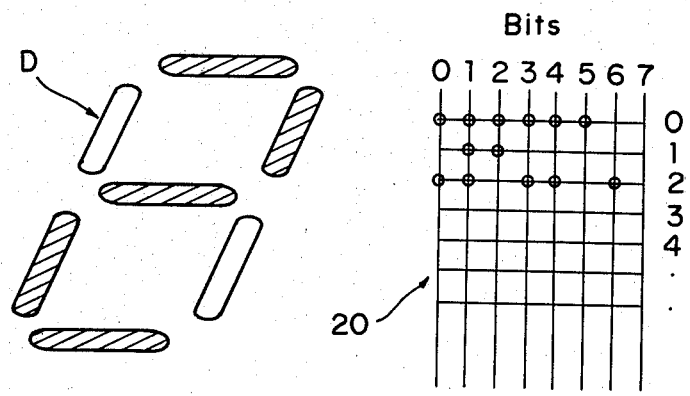
Fig_7
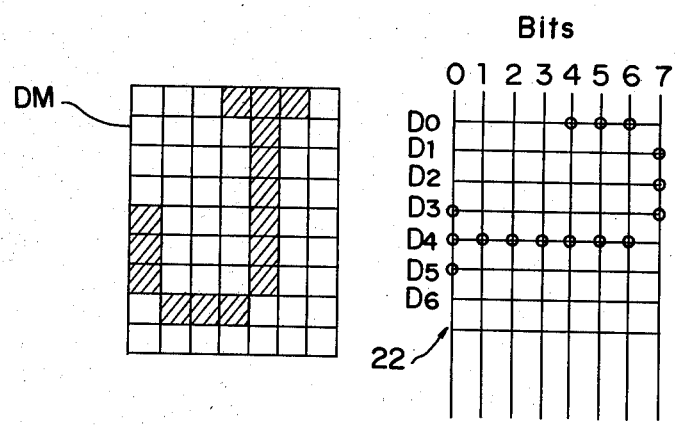

4,323,022

PATTERN SELECTING SYSTEM FOR ELECTRONIC SEWING MACHINE

BACKGROUND OF THE INVENTION

1. Field of the Invention

This invention relates to a sewing machine, and more particularly relates to a pattern selecting system for an electronic sewing machine which has an electronic memory storing pattern data which is read out during operation of the sewing machine to vary needle position and feed rate of the cloth sewn, to thereby produce a selected stitch pattern.

2. Brief Description of the Prior Art

In conventional electronic sewing machines, all pro-programmed patterns are indicated on a front panel of the sewing machine. For example, 20 such patterns may be displayed in two groups of elongated rows of 10 different patterns each. These patterns can be selected by operation of only 10 pushbuttons by using a separate switch to enable the pushbuttons to select patterns in either of the two rows. Alternatively, a plurality of patterns may be indicated in one lateral row on the front panel, and these patterns may be selected by one or two pushbuttons. In this latter system, if one switch is kept pushed, each the patterns is sequentially illuminated by a corresponding lamp as the row is traversed in one direction. When a desired pattern is reached, the pushbutton is released. As a result, only the lamp for the desired pattern remains lit. One more pushbutton may be employed to cause the row to be traversed in the opposite direction.

At all events, in conventional practice, the patterns programmed into the memory are all indicated on the front panel of the sewing machine. The limited space of the front panel and the outer design of the sewing machine dictate that the number of patterns so indicated be limited to a maximum of 20 or slightly more.

However, a memory of an electronic sewing machine can perhaps hold more than 100 programmed patterns (depending upon the capacity of the memory) without requiring a large physical size of the memory. Hence, it can be said that conventional pattern selecting systems of electronic sewing machine fail to utilize the memory fully, limiting the effective usability of such machines.

SUMMARY OF THE INVENTION

This invention has been provided to eliminate the defects and disadvantages of the prior art. It is a primary object of this invention to provide an electronic sewing machine which is able to produce a large number of stitch patterns by fully utilizing such an electronic memory.

It is another object of the invention to provide a pattern selecting system to enable all such stitch patterns to be selected.

It is still another object of the invention to provide a pattern selecting system improved both in design and in operation.

In this invention, the memory stores a large number of stitch patterns including both stitch patterns which are frequently used and stitch patterns which are not frequently used. Since the front panel of a sewing machine is not large and since even very limited electronic memories can store more than 100 patterns, a limited number of most frequently used patterns are indicated on the front panel. The other patterns, which are not so frequently used, are listed in a different location which is normally concealed such as the inner face of a hinged top plate of the sewing machine, or on a separate pattern guide. The more frequently used patterns are each selected by a corresponding pushbutton. The other patterns, which are not so frequently used, are each associated with a two digit decimal number, and are each selected by two additional pushbuttons operated in accordance with such numbers. The two additional pushbuttons are located on the front face of the sewing machine and the selected pattern number is displayed in a window while the initial address data of the specific pattern desired is designated. Alternatively, the selected pattern may be alphanumerically displayed in the window by operation of a single pushbutton, which simultaneously addresses the initial data of the pattern desired.

The other features and advantages of the invention will be apparent from the following description of the invention in reference to the attached drawings.

BRIEF DESCRIPTION OF THE DRAWINGS

FIG. 1 is a front elevational view of a sewing machine which uses the invention;

FIG. 2 is a block diagram of the invention;

FIG. 3 is a flow chart showing the operation of the invention;

FIG. 4 is another possible flow chart showing the operation of the invention;

FIG. 5 is a view of the display in the invention;

FIG. 6 is a front view of a portion of a second embodiment of the invention; and FIG. 7 is a view of the display used in the second embodiment of the invention.

DETAILED DESCRIPTION OF PREFERRED EMBODIMENTS

Referring first to FIG. 1, reference numeral 1 denotes a sewing machine, reference numeral 2 shows the pattern selecting region of the sewing machine, and reference characters K1 through Kn denote pattern-selecting pushbuttons for the more frequently used patterns. Each of the pushbuttons K1 through Kn corresponds to one of the more frequently used patterns displayed at panels P1 through Pn.

L1 through Ln indicate LEDs which are each located behind a corresponding panel, and LEDs L1 through Ln form an LED matrix 5 shown in FIG. 2.

Ka and Kb indicate pushbuttons used to key in decimal numbers displayed by 7-segment diodes in windows 3 and 4 respectively. The two-digit decimal numbers keyed in by the pushbuttons Ka and Kb characterize patterns which are used less frequently and may be listed in a normally concealed location, such as on the underside of the top plate (not illustrated) of the sewing machine. Kc shows a clear button operated to clear a display in windows 3 and 4. Clear key Kc, together with keys K1, through Kn and Ka and Kb form a key matrix 6 shown in FIG. 2.

Selection of stitching patterns will be discussed with reference to FIG. 2. If any one of the nonfrequently used pushbuttons K1 through Kn is pushed, the corresponding panel P1 through Pn is lighted by a corresponding LED in LED matrix 5, and the address of the corresponding pattern data in the read only memory ROM (located in control system 7) is accessed. When machine controller 9 is then operated, machine motor 11 is controlled by a motor control 10 to operate the sewing machine, and pattern data in ROW 8 is sequentially read out upon receipt of signals from needle position detector 12 as the sewing machine rotates. This pattern data is given to pulse motor drivers 13 and 14 to drive needle and feed control pulse motors 15 and 16 respectively. Thus, the selected pattern is stitched.

There may be two methods of selecting less frequently used patterns. In one, the pushbuttons Ka and Kb are repeatedly pressed until a desired two digit number is displayed in windows 3 and 4 in a sequential method. In the other pushbuttons Ka and Kb are kept pressed as the numbers change in succession until a two digit number is displayed, in a continuous method.

The sequential method will first be discussed. If a pattern number 25 is desired, key Ka is pushed twice to display the number 2 in the window 3, and then the key Kb is pushed five times to display the number 5 in window 4. In this method the upper 4 bits and the lower 4 bits of a byte signal are counted, depending upon operation of the keys Ka and Kb, by a program in the control system 7 scanning ROM 8 through the input port A. Thus, the address of the pattern corresponding to the pattern number 25 is accessed and the pattern number is displayed on 7-segment diodes Da and Db of windows 3 and 4 of indicator 17. Diodes Da and Db may be either un-lighted or may display zeros when keys Ka and Kb are not operated. In FIG. 2, reference numeral 18 indicates a variable resistor which is manually adjusted to determine lateral needle swing amplitude and the feed rate via A/D converter 19.

FIG. 3 is a flow chart showing how the sequential method operates. If key Ka or Kb is pressed and then released, its on or off state is identified. If the key is off, a flag in control part 7 is set. If the key is on, a 1 is counted in case way was previously off, and the flag is cleared. Input is then possible by depression of the key if machine controller 9 is not turned on. Numbers inputted by operation of keys Ka and Kb are progressively shown on diodes Da and Db in windows 3 and 4, using data obtained from a designation table 20 located in control system part 7 and shown in FIG. 5. If depression of the keys ceases, the numbers do not increase and the last keyed numerals remain on diodes Da and Db.

FIG. 5 shows a case in which a key is repeatedly pressed to show a "2" on a 7-segment diode according to designation table 20. Designation table 20 is used in both 7-segment diodes Da and Db to simplify structure. The switchover of the indication is made by switching a cathode common of diodes Da or Db by the bit signal. When machine controller 9 is operated after a desired pattern number has been selected by depression of keys Ka and Kb and an address of a pattern corresponding to the selected pattern number has thus been accessed, the selection and the address remain as they have been and the selected pattern is sewn.

The continuous method will now be discussed. In this method, keys Ka and Kb are kept pressed until a desired two digit appears. When the pattern indexed by, for example, pattern number "25", the display from 0 to 1 to 2 while key Ka is depressed and when "2" appears on window 3, keys Ka is released. Similarly, the key Kb remains until "5" is displayed in window 4. Thus, the address of the pattern data corresponding to the pattern number "25" is accessed. Similarly, when the machine controller 9 is operated, the desired pattern is stitched, as in the sequential method, independently of any operation of keys Ka and Kb.

FIG. 4 is a flow chart showing how such display change occurs. If key Ka or Kb is continuously depressed, its on or off state is identified. If the key is on, 1 is count up through the input port (A) of the control part 7 and an accumulator Acc is set at 0. A closed incrementation loop is formed by comparison of the constant of accumulator Acc with FF and incrementation of the contents Acc by 1. A signal recycles through the closed loop until the contents of Acc equals FF, which is set to 255 (11111111 in binary) with the contents of accumulator Acc being incremented by 1 each time the loop is traversed. After the signal passes the closed loop 256 times, the contents of accumulator Acc equals FF and the loop is exited. If machine controller 9 is operated, the next cycle is begun. As long as the key Ka is pushed, the display on window 3 is incremented each time the count-up occurs. Operation is the same with respect to key Kb. If keys Ka and Kb are released when a desired two-figure number has been reached the display is maintained in windows 3 and 4. If machine controller 9 is then operated, the selected pattern is stitched.

FIG. 6 shows a second control region 26 in the invention, in which the infrequently used stitch patterns are displayed by way of a 7×9 dotted matrix DM in window 21 by pushing a pushbutton key Kd, which selects the address of the desired pattern. K'c is a pushbutton key for clearing a displayed pattern indication and its corresponding address data. In other respects, control region 26 is identical to selecting region 2. They key Kd, together with keys K2 through Kn, and key K'c makes up key matrix 6 as shown in FIG. 2.

Since selection of frequently used patterns is the same as in the first embodiment discussed above, only the selection of the less frequently used keys will be described below. As before, the Kd may be operated sequentially or continuously according to the flowcharts in FIGS. 3 and 4. Therefore, detailed explanation is omitted in this respect. If stitch patterns are listed alphanumerically, key Kd can be operated to make the display on the 7×9 dotted matrix DM change in an alphabetic sequence. When a desired pattern indication is reached, depression key Kd ceases. For example, if a pattern J is selected, the letter "J" appears on the 7×9 dotted matrix DM as shown in FIG. 7. By operation of the key Kd, the J-designation table 22 is counted and scanned from D0 to D6. Thus the pattern "J" is indicated on the 7×9 dotted matrix DM and the address of pattern data "J" in ROM 8 is accessed. At this point, if the operation of the key Kd is stopped, the selection of the pattern is completed. Then, if machine controller 9 is operated, the pattern indication and the designation of the initial address are not changed by subsequent operation of the key Kd, and the pattern is stitched from the designated address.

We claim:

1. A pattern selection system for use with an electronic sewing machine with a memory, in order to allow patterns which have all pattern data stored in the memory to be selected by a user, when the patterns are divided into a first group and a second group, in which groups the patterns in the first group are more frequently used and the patterns in the second group are less frequently used, comprising: a plurality of first pushbuttons, each such first pushbutton being associated with a corresponding one of the patterns in the first group so as to bring the first pushbuttons and the patterns in the first group into one-to-one correspondence with each other; a like plurality of indicator panels, each indicator panel depicting a corresponding one of the patterns and being located adjacent the first pushbutton corresponding thereto; a like plurality of lamps, each lamp being associated with a corresponding one of the indicator panels in a manner that when one of the patterns in the first group has been selected by a user, the corresponding panel will be illuminated; a display; at least one second pushbutton located adjacent the display and cooperating therewith in a manner that the display will indicate at least one numerical or alphabetical character identifying a pattern in the second group which has been selected by a user by operation of all such second pushbuttons; and means connected to the memory, all pushbuttons, all lamps, and the display and cooperating therewith in a manner that when a pattern in the second group has been selected by actuating the second pushbuttons, the sewing machine will be programmed to adjust needle movement and feed rate in a manner that the pattern in the second group so selected will be sewn by the machine irrespective of the actuation of the first pushbuttons.

2. The system defined in claim 1, wherein the display includes two display windows, wherein there are two second pushbuttons, each cooperating with a corresponding window to cause the window to display a decimal digit therein, and wherein there are at most 99 patterns in the second group.

3. The system defined in claim 2, wherein each window includes a seven-segment diode.

4. The system defined in claim 2, wherein each lamp is a light-emitting diode.

5. A system defined in claim 1, wherein the display is a 7 by 9 dot matrix, wherein there is one second pushbutton, and wherein the character is alphameric.

6. The system defined in claims 2 or 5, further including a clear pushbutton clearing all characters displayed in the display.

* * * * *